April 28, 1959   T. W. MULLEN   2,884,041
TUBELESS TIRE BEAD REPAIR
Filed June 10, 1957
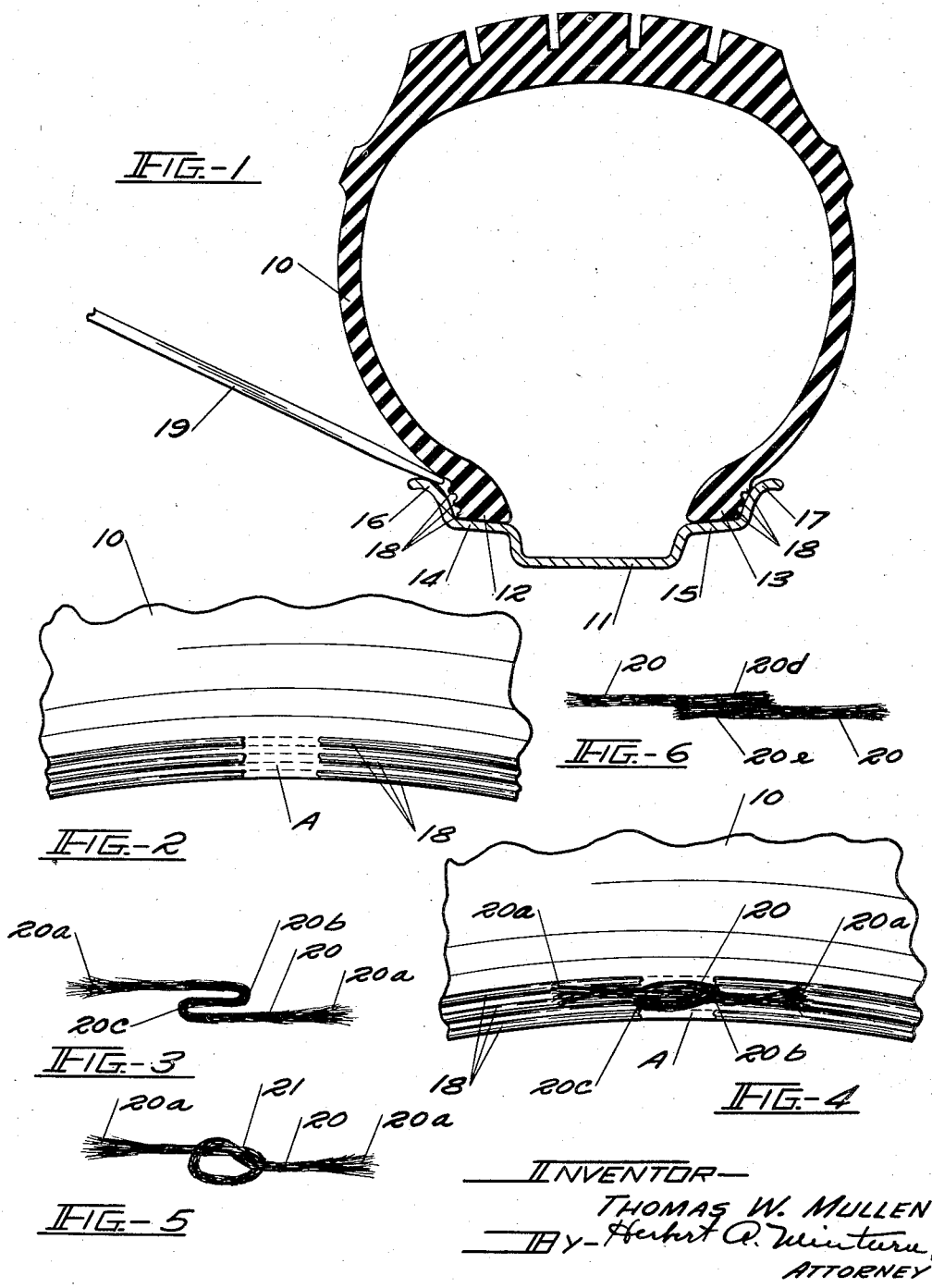
INVENTOR—
THOMAS W. MULLEN
By Herbert A. Minturn,
ATTORNEY

2,884,041
TUBELESS TIRE BEAD REPAIR

Thomas W. Mullen, Evansville, Ind.

Application June 10, 1957, Serial No. 664,580

1 Claim. (Cl. 152—362)

This invention relates to a repair of damaged sealing beads on tubeless tires, particularly wherein the bead has become damaged upon taking the tire off of the rim, such as by having the sealing area of the tire bead which normally bears against the rim flange damaged by a tire tool scarring that area or cutting through it to that extent where the seal is no longer to be had and air leaks out between the bead and the tire rim flange.

Normally, the tire bead on its outer face is provided with a plurality of concentric ribs of a rather soft and easily deformable nature which will be pressed into sealing contact with the rim flange to effect the air seal. When these ribs become damaged by being cut through, or even scraped off by a tire tool, or cut in dragging the tire bead over the edge of the tire rim, cements and rubber coatings and the like will not be sufficient to effect the air seal.

It has been discovered that there must be some body to a repair to a tire bead which will not be displaceable by air flow, and yet which may be readily deformed under pressure of the bead against the tire rim flange so that the damaged zone of the bead will not only be completely filled in, but there will also be an extension of the repair to either side thereof of gradually diminishing thickness which will eventually blend into the undamaged portion of the seal zone.

The primary object of the invention is to provide a seal of that nature.

The invention will be described in one particular form as illustrated in the accompanying drawing, in which Fig. 1 is a view in radial section transversely through a tubeless tire mounted on a rim;

Fig. 2 is a view in detail in side elevation of the bead zone of the tire showing a damaged area;

Fig. 3 is a length of repair material;

Fig. 4 is a view similar to that of Fig. 2 with the repair applied to the tire bead;

Fig. 5 is a view of a length of tire repair material in knotted form; and

Fig. 6 is a view of the tire repair material arranged in a modified form.

As illustrated in Fig. 1, the tire 10 is normally carried on a rim 11 herein shown as of the drop center type wherein the tire beads 12 and 13 rest upon annular portions 14 and 15 of the rim 11 immediately adjacent the outer and upturned side flanges 16 and 17. Around the exterior side of each of the beads 12 and 13 there are provided ribs 18 extending concentrically therearound, herein shown as three in number.

With air pressure inside of the tire 10, the beads 12 and 13 are forced outwardly against the flanges 16 and 17 respectively to in turn press the ribs 18 against the flanges to effect the air seal. Normally this seal is entirely adequate during normal operation of the tire in service. Sometimes the seal will leak particularly where the flanges 16 and 17 may become bent, but most particularly when the tire 10 is deflated and is removed from the rim 11 by any such means as a tire tool 19 which is forced between the flange 16 or 17 to push the bead 12 or 13 away from the flange so as to break the seal and permit one bead at least to be dropped into the central portion of the rim 11 to permit the removal of the tire 10 over the rim. When the tool 19 is forced downwardly inside of the rim flange 16 or 17, it is an exceedingly difficult matter to prevent the end of the tool from cutting down across the ribs 18, and in some cases, these ribs will be entirely cut through as indicated by the zone A in Fig. 2. Then of course, when the tire is returned to the rim, there is not an adequate seal across that zone A and air will leak past.

In order to repair the bead to overcome such difficulties, there is provided a repair which usage in the field has proved to be entirely adequate, and very easily and readily made.

In making this repair, there is provided a length of cord or twine 20 which will have the same general characteristics as the twine illustrated in my co-pending application Serial No. 594,962 filed June 29, 1956, now Patent No. 2,803,284.

This twine is composed of a plurality of fibers preferably twisted together to some extent, but loosely so into a soft twine for ease in handling and in making the repair. The individual fibers making up the twine are preferably of minute cross-section, and the important characteristic of the twine itself is that it be soft and readily deformable as well as compressible, such characteristic being induced by the great multiplicity of individual fibers which are loosely embodied in the twine.

The characteristic of being readily deformable is required so that the twine may be made to conform intimately to irregular surfaces across the ribs of the tire bead whereby the twine may become less in cross-section in parts thereof and not completely compressed in other parts, and the twine may be sharply bendable to swell in effect and flow figuratively into the pits or hollows of the deformed zone as well as into adjacent parts of the ribs extending from that damaged zone.

Then there must be the further characteristic in spite of the softness and readily reduced lateral deformation of the twine, that there be interstices between individual fibers to receive a filling and coating intimately of an air-sealant material. The term "twine" is employed in a generic sense to include string, cord, and yarn and also to include fibers softly twisted or not twisted at all.

This twine may be selected from a large number or group of materials including jute, hemp, silk, flax (linen), cotton, synthetic fibers such as nylon and glass and the like.

The second element of the repair material consists of an air-sealant which is preferably reduced in quantity to a film of material adhering to the individual fibers making up the twine, filling in the interstices between the individual fibers, between strands of fibers, and between the twine itself and the surfaces of the bead over which the twine is to be placed, as will hereinafter be explained.

This air-sealant may be any one of or a mixture of a wide variety of substances such for example as coating materials including lacquers, waxes, varnishes, and paints, many of which are classified as plastics because of their resinous content. Of these resins there are the acetals, alkyds, allyls, asphalts, cellulosics, chlorinated rubber and paraffins, cumarones, ethylenes, melamines, phenolics, shellacs, and other natural materials, silicones, styrenes, ureas, vinyls, and virtually all elastomers.

Plastic resins generally used in adhesives alone, or in mixtures are usable ari-sealants. Such resins include cellulose nitrate, acetate, acetate-butyrate; ethyl and methyl cellulose; vinyl acetate, chloride, chloride acetate polymers, and acetols; phenol, resorcinol, furfuryl, urea melamines, and other formaldehydes; urea resorcinal melamines; natural, synthetic, and plastic elastomers; proteins, asphalt; shellac and vegetable starches.

So are usable waxes and gums, natural and synthetic, such as caoutchouc, and beeswax; and cashew-nut aldehyde plastics in tough rubbery forms.

In the foregoing, will be included rubber, cured or uncured, both natural and synthetic; resins including both animal and vegetable materials; albumins and casein; a mixture of a latex, pine rosin, and petrolatum or other grease or oil; asphalt mixed with a latex of rubber nature; an asphalt with a filler such as ground or finely divided cork or rubber, or other fibrous materials such as asbestos and fibers such as may be used in the twine itself.

These and many other air-sealant materials are preferably tacky and adhesive, when they are applied to the twine fibers. In any event the air-sealant material must be deformable even if it is in a solid state such as is rubber. It is considered for the purpose of description herein that the cured rubber or semi-cured rubber and other forms of rubber when applied to the twine are flowable into deformed states and flow back elastically into their original condition as much as may be had under the pressure of the tire bead when the repair is in place and the tire is inflated. As above indicated, the more fluid-like materials have a tacky consistency for high adherence to the twine fibers. It is to be pointed out that this air-sealant material is not primarily a cement in the generally accepted meaning, since its primary function is to seal off possible air passages longitudinally of the fibers as well as laterally thereof of the primary repair medium, the twine itself.

The repair material is thus made up by applying the air-sealant material to the twine and holding it in readiness for use by packaging it in some material such as aluminum foil or plastic bags in order that the material does not adhere to other articles prior to being used, or in some cases does not become dried out by exposure to oxygen.

The twine is cut into lengths such as in the neighborhood of from four to six inches, and the ends of the twine are left free so that they may in effect be frayed out.

When a leak is detected between the bead and the tire rim flange, the tire 10 is preferably deflated to permit the bead in the zone of the leakage being pushed back away from the rim, such as flange 16 for example. In this clearance, there is laid a length of the twine 20, and then the tire 10 is reinflated to cause the bead 12, for example, to compress the length of twine 20 between it and the flange 16 to effect the seal. This repair will be entirely sufficient where there has been no particular damage done to the individual ribs 18. The length of twine 20 will be laid around the ribs in the concentric direction of those ribs to have the ends 20a resting on the ribs, the frayed ends of course furnishing an end structure which is diminishing in thickness as compared to the central major length of the twine. Pressure of the bead against the twine 20 will cause the ribs to become imbedded in the twine with the twine flowing and deforming itself between ribs, squeezing the air-sealant into and around those ribs to completely seal off any formerly existing air passages.

However when the ribs 18 are damaged as is indicated in Fig. 2 to have the ribs completely destroyed or partially destroyed across the zone A, the length of twine 20 is preferably increased in thickness so as to have the greater thickness of the twine extend across the zone A in the directions of the ribs 18. This increased thickness may be had such as by looping the twine back over itself through the two bends 20b and 20c and then placing that increased thickness, three thicknesses of the twine in this case, over the zone A as indicated in Fig. 4. The single thicknesses of the twine, one extending from each end of the folded over portion, extend around over the ribs 18 and their fraying out end portions so as to gradually diminish the thickness of the twine in those directions.

Then the tire is inflated again to cause the bead to press the twine thus formed against the rim flange 16 again effecting a very certain seal.

A modification of providing an increased thickness in a central zone of the length of the twine 20 is illustrated in Fig. 5 where the twine is loosely knotted as at 21, and this knot is then laid in the zone A, to afford the thicker portion of the twine between the undamaged ends of the ribs 18. Again the frayed out ends 20a are applied over the undamaged rib portions adjacent the zone A to afford the gradually diminishing thickness necessary to bring about the complete air sealing.

The twine 20 may also be arranged differently to form an increased thickness over the carcass damaged zone A by taking two lengths of the twine 20 and overlapping adjacent end portions 20d and 20e, Fig. 6.

This method of making the repair of a bead is particularly effective because the zone A will never be a plane surface and neither is it possible to cut off any repair to an exact fit between the opposing ends of the ribs across the zone A to effect an air seal. The twine alone in the absence of the air-sealant would not be effective since air would eventually travel through the twine between the fibers, and neither would the air-sealant itself be effective in the absence of the twine in view of the fact that the bead is subject to varying pressures as the tire rotates under load and under flexing, and still further, where the leak is due to a bent zone in the rim itself, that zone has to be built up to make the air seal, and the sealing material cannot be allowed to flow in and out of it without some device such as the twine retaining the air-sealant in position.

Therefore it is to be seen that I have provided a quite unique tire repair in respect leaks past the bead and the tire rim by use of a deformable, flowable air-sealant impregnating a fibrous twine which in itself is quite loose and deformable. It is to be pointed out that the fiber above defined should be substantially non-stretchable longitudinally of its length in order that it will not bow out radially of the tire bead but will be sufficiently strong in that respect to bridge the zone A where the ribs may have been interrupted. That is to say, the twine 20 is deformable in both lateral and longitudinal directions, yet it is substantially non-stretchable longitudinally to be sufficiently strong to avoid the displacement radially as indicated.

I claim:

The combination with a tire rim having an upturned annular flange, a tire having a bead, and radially spaced apart annular ribs around the side of said bead normally air-sealably pressing against said flange, of a repair for leaking ribs comprising a length of a soft readily deformable and compressible fibrous material laid around said ribs, said material comprising a length of a soft, readily deformable and compressible fibrous mass sharply bendable to fit intimately between and over and along said ribs, and an air-sealant of a tacky, adhesive nature coating said fibers and filling in the fiber interstices in the fiber assembled material, the ends of said fibers in said mass being left free and frayed out to provide a tapering, lessening thickness of the material at its ends, said fibrous material being further characterized by being moldable in cross-section and without growth thereby in length, thereby resisting bowing out of the material radially of said bead under air pressure from the tire and centrifugal action induced by rotation of the tire.

References Cited in the file of this patent

UNITED STATES PATENTS 2,601,394     Hansen _____ June 24, 1952

OTHER REFERENCES

Time Magazine, vol. LXIV, No. 13, September 27, 1954, page 8 cited as "Time."